(12) United States Patent
Ward et al.

(10) Patent No.: US 11,270,242 B2
(45) Date of Patent: Mar. 8, 2022

(54) IDENTIFYING AND EVALUATING RISKS ACROSS RISK ALERT SOURCES

(71) Applicant: INTERNATIONAL BUSINESS MACHINES CORPORATION, Armonk, NY (US)

(72) Inventors: Thomas Ward, Highland, NY (US); Rahul Nahar, South Burlington, VT (US); Chanchai Saha, Beacon, NY (US); Kanayo Okonji, Wappingers Falls, NY (US); Bhanwar Gupta, Ambala (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 401 days.

(21) Appl. No.: 16/153,986

(22) Filed: Oct. 8, 2018

(65) Prior Publication Data
US 2020/0111038 A1    Apr. 9, 2020

(51) Int. Cl.
*G06Q 10/06*    (2012.01)
*G06K 9/62*    (2022.01)
(Continued)

(52) U.S. Cl.
CPC ......... *G06Q 10/0635* (2013.01); *G06F 16/29* (2019.01); *G06K 9/6218* (2013.01); *G06N 20/00* (2019.01)

(58) Field of Classification Search
CPC .... G06Q 10/0635; G06N 20/00; G06F 16/29; G06K 9/6218
(Continued)

(56) References Cited

U.S. PATENT DOCUMENTS

| 8,712,907 B1 | 4/2014 | Stibel et al. |
| 8,949,676 B2 * | 2/2015 | Behrendt ............ G06F 11/3006 714/43 |

(Continued)

OTHER PUBLICATIONS

Pew Research Center, (Media Creditability: Key News Audiences Now Blend Online and Traditional Source), Aug. 17, 2008 https://www.pewresearch.org/politics/2008/08/17/media-credibility/ (Year: 2008).*

(Continued)

*Primary Examiner* — Charles Guiliano
*Assistant Examiner* — Thea Labogin
(74) *Attorney, Agent, or Firm* — Cantor Colburn LLP; Tihon Poltavets (57) ABSTRACT

Methods, systems, and computer program products for identifying and evaluating risk alerts are provided. Aspects include receiving risk alert data comprising risk alerts from data sources, obtaining, by the processor, client geographical data comprising one or more locations of interest, wherein the one or more locations of interest comprise infrastructure resource for the client, determining one or more trusted data sources that are most relevant to define an impact of one or more risk events from the risk alert data affecting one or more locations of interest for the client based on the risk alert data and the client geographical data, determining impactful risk events that affect locations of interest for the client based on trusted risk alert data from the trusted data sources and the client geographical data, and displaying the trusted data sources, the one or more impactful risk events, and the one or more locations.

15 Claims, 9 Drawing Sheets

(51) Int. Cl.
*G06N 20/00* (2019.01)
*G06F 16/29* (2019.01)

(58) Field of Classification Search
USPC ........................................................ 705/7.28
See application file for complete search history.

(56) References Cited

U.S. PATENT DOCUMENTS

| | | | | |
|---|---|---|---|---|
| 9,541,407 | B1* | 1/2017 | Mohler | H04W 4/90 |
| 10,289,949 | B2* | 5/2019 | Baughman | G06N 3/0472 |
| 2009/0171722 | A1 | 7/2009 | Roberts | |
| 2014/0018951 | A1 | 1/2014 | Linton et al. | |
| 2015/0347941 | A1 | 12/2015 | Yund, IV et al. | |
| 2017/0017883 | A1 | 1/2017 | Zhou et al. | |

OTHER PUBLICATIONS

City Government and IBM Partner to Make Rio de Janerio a Smarter City Dec. 27, 2010 https://www.youtube.com/watch?v=kj3d_nlvt8o (Year: 2010).*

AmericanPress Institute ( Chapter 3: Newspaper subscribers vs other types of subscribers), 2017 https://www.americanpressinstitute.org/publications/reports/survey-research/newspaper-vs-other-subscribers/ (Year: 2017).*

Leysia Palen, Kenneth M. Anderson and Gloria Mark et al. A Vision for Technology-Mediated Support for Public Participation & Assistance in Mass Emergencies & Disasters. DOI: 10.14236/ewic/VOCS2010.8 (Year: 2010).*

Apte et al. Managing the service supply chain in the Department of Defense: Opportunities and challenges. No. NPS-AM-06-032. Naval Postgraduate School Monterey CA Graduate School of Business and Public Policy, 2006.

Braunscheidel et al., "The organizational antecedents of a firm's supply chain agility for risk mitigation and response." Journal of operations Management 27.2 (2009): 119-140.

Fernandez-Delgado et al. "Do we need hundreds of classifiers to solve real world classification problems." J. Mach. Learn. Res 15.1 (2014): 3133-3181.

Kumar, "Risk Management in Supply Chains", Diss, The University of Texas at Dallas, ProQuest Dissertations Publishing, 2009.

Neiger et al., "Supply chain risk identification with value-focused process engineering" Journal of Operations Management 27 (2009) 154-168.

* cited by examiner

| | Data Source 1 502-1 | | | Data Source 2 502-2 | | | ... | Data Source m 502-m | | |
|---|---|---|---|---|---|---|---|---|---|---|
| | Popularity 506a | Proximity 506b | Trust 506c | Popularity 506a | Proximity 506b | Trust 506c | ... | Popularity 506a | Proximity 506b | Trust 506c |
| Risk Event 1 (504-1) | 1 | 3 | 1 | 2 | 1 | 3 | ... | 1 | 3 | 3 |
| Risk Event 2 (504-2) | 2 | 2 | 2 | 3 | 2 | 2 | ... | 2 | 1 | 2 |
| Risk Event 3 (504-3) | 1 | 3 | 1 | 3 | 1 | 3 | ... | 2 | 3 | 3 |
| . | 3 | 2 | 3 | 1 | 1 | 2 | ... | 1 | 2 | 2 |
| . | 2 | 3 | 2 | 1 | 2 | 3 | ... | 1 | 1 | 1 |
| . | 1 | 1 | 1 | 3 | 1 | 2 | ... | 2 | 1 | 2 |
| Risk Event n (504-n) | 2 | 1 | 2 | 3 | 1 | 1 | ... | 1 | 3 | 1 |

| | Cluster 1 | | | Cluster 2 | | | Cluster 3 | | |
|---|---|---|---|---|---|---|---|---|---|
| Risk Event 1 | DS 3 | DS m | | DS 2 | | | DS 1 | | |
| Risk Event 2 | DS 1 | DS 2 | DS 3 | DS m | | | | | |
| Risk Event 3 | DS 2 | DS m | | DS 2 | | | DS 1 | | DS 3 |

FIG. 6

| | Non-Impacting | Potentially - Impacting | Confirmed - Impacting |
|---|---|---|---|
| Risk Event 1 | Location 1 | Location 2 | Location 3 |
| Risk Event 2 | Location 2 | Location 1 & 3 | - |
| Risk Event 3 | Location 1 & 3 | - | Location 2 |

IDENTIFYING AND EVALUATING RISKS ACROSS RISK ALERT SOURCES

BACKGROUND

The present invention generally relates to risk event analysis, and more specifically, to an ensemble analysis for identifying and evaluating risks across multiple risk alert data sources.

Presently, there are a host of sources and services that provide risk alerts to companies and individuals. The risk alert sources and services can be free and/or subscription-based feeds such as news feeds and the like. For global companies, the number of data feeds, warnings, watches, and/or advisories across these risk alert services and sources can be numerous. For example, during a two-week period in early January, 2018, over 850,000 alerts of potentially impacting events for locations of interest on the eastern coast of the United States were generated by a variety of data sources. With such a large volume of risk alerts that span across a wide variety of risk areas, some companies and individuals may have difficulty sifting through this large volume of data. The ability to analyze data across multiple sources on a real time basis to characterize potential risk events and identifying high probability impacting risk events for any companies and individuals point of interests are can be a challenge.

SUMMARY

Embodiments of the present invention are directed to a computer-implemented method for identifying critical risk events from noise. The present invention directs to a computer implemented method to identify the trusted data sources that are most relevant to define the intensity and impacting locations of one or more current risk events. A non-limiting example of the computer-implemented method includes receiving, by a processor, risk alert data comprising one or more risk alerts from one or more data sources, obtaining, by the processor, client geographical data comprising one or more locations of interest for a client, wherein each of the one or more locations of interest comprise at least one infrastructure resource for the client, determining one or more trusted data sources from the one or more data sources that are most relevant to define an impact of one or more risk events from the risk alert data affecting one or more locations of interest for the client based on the risk alert data and the client geographical data, determining one or more impactful risk events that affect one or more locations of interest for the client based on trusted risk alert data from the one or more trusted data sources and the client geographical data, and displaying the one or more trusted data sources, the one or more impactful risk events, and the one or more locations.

Embodiments of the present invention are directed to a system for identifying one or more locations of interests most impacted due to one or more impacting risk events. A non-limiting example of the system includes a processor coupled to a memory, the processor configured to perform receiving, by a processor, risk alert data comprising one or more risk alerts from one or more data sources, obtaining, by the processor, client geographical data comprising one or more locations of interest for a client, wherein each of the one or more locations of interest comprise at least one infrastructure resource for the client, determining one or more trusted data sources from the one or more data sources that are most relevant to define an impact of one or more risk events from the risk alert data affecting one or more locations of interest for the client based on the risk alert data and the client geographical data, determining one or more impactful risk events that affect one or more locations of interest for the client based on trusted risk alert data from the one or more trusted data sources and the client geographical data, and displaying the one or more trusted data sources, the one or more impactful risk events, and the one or more locations.

Embodiments of the invention are directed to a computer program product for identifying trusted data sources for impacting risk events and using those trusted data sources for identifying locations of interests most impacted due to potential risk events, the computer program product comprising a computer readable storage medium having program instructions embodied therewith. The program instructions are executable by a processor to cause the processor to perform a method. A non-limiting example of the method includes receiving, by a processor, risk alert data comprising one or more risk alerts from one or more data sources, obtaining, by the processor, client geographical data comprising one or more locations of interest for a client, wherein each of the one or more locations of interest comprise at least one infrastructure resource for the client, determining one or more trusted data sources from the one or more data sources that are most relevant to define an impact of one or more risk events from the risk alert data affecting one or more locations of interest for the client based on the risk alert data and the client geographical data, determining one or more impactful risk events that affect one or more locations of interest for the client based on trusted risk alert data from the one or more trusted data sources and the client geographical data, and displaying the one or more trusted data sources, the one or more impactful risk events, and the one or more locations.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
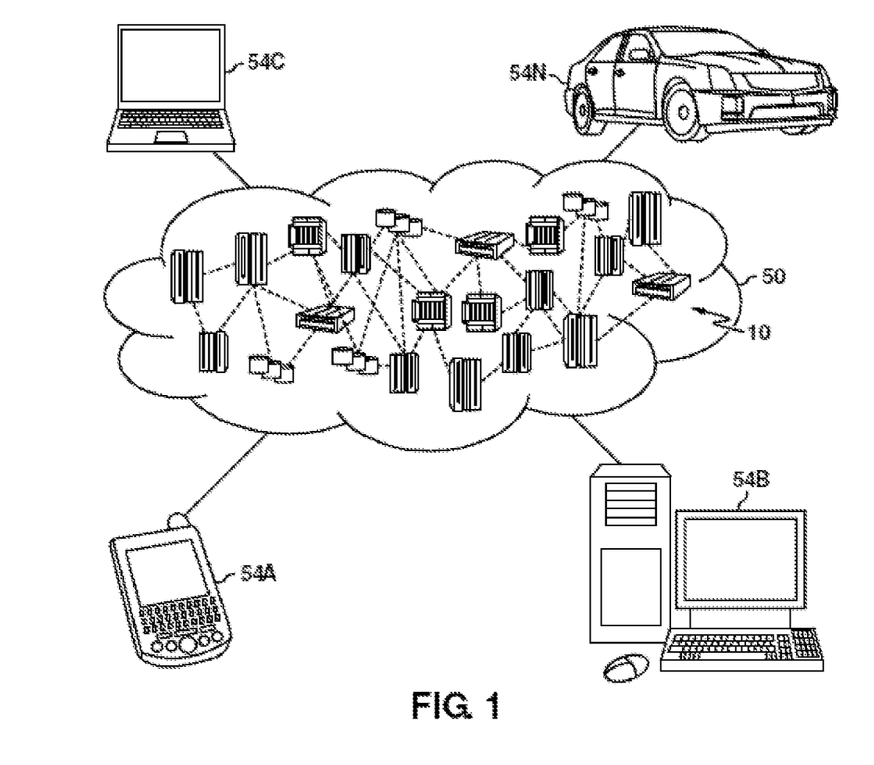
FIG. 1 depicts a cloud computing environment according to one or more embodiments of the present invention.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
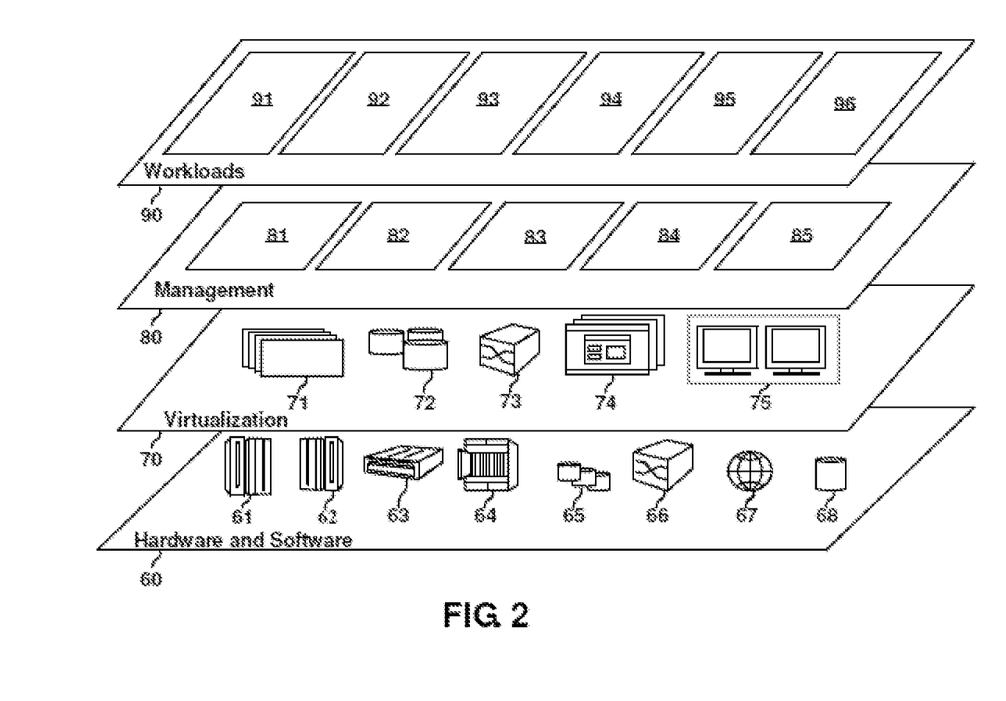
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and risk event analysis 96.

Figure 3:
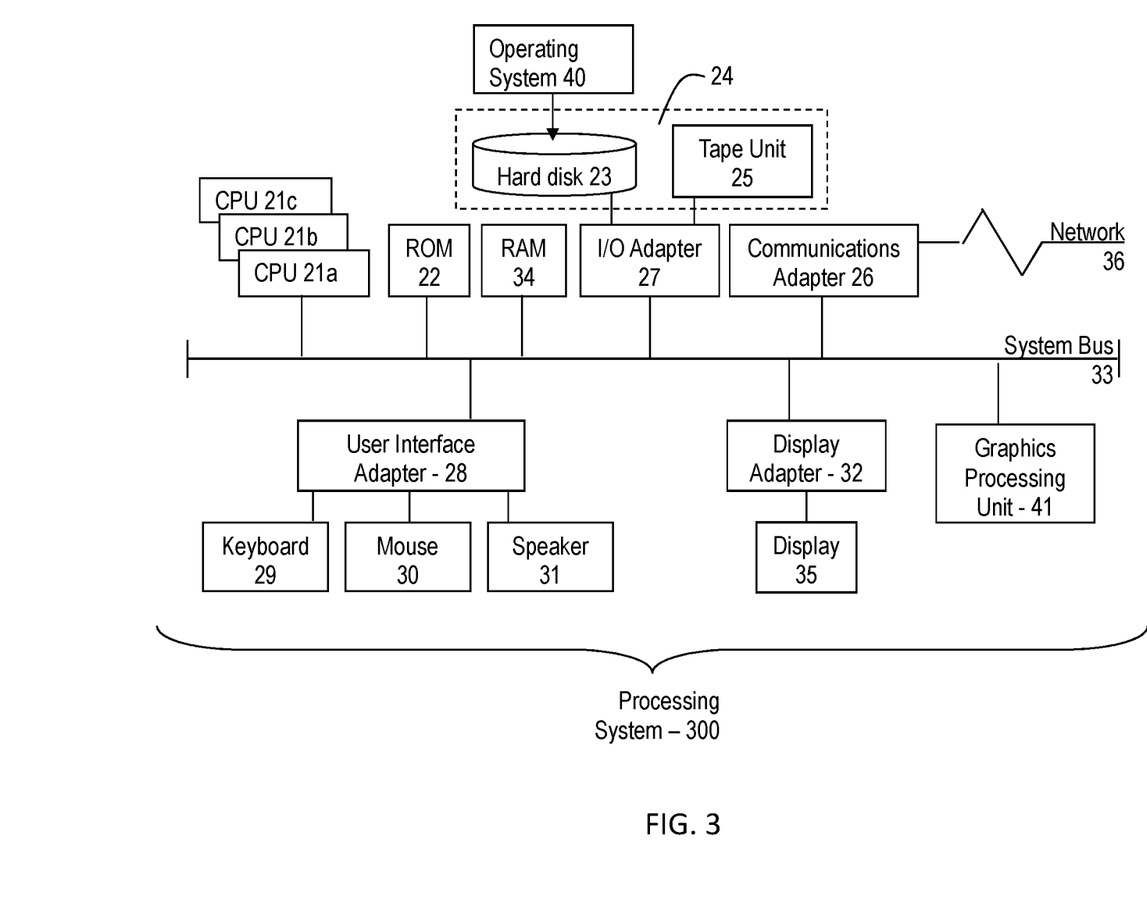
FIG. 3 depicts a block diagram of a computer system for use in implementing one or more embodiments of the present invention.

Referring to FIG. 3, there is shown an embodiment of a processing system 300 for implementing the teachings herein. In this embodiment, the system 300 has one or more central processing units (processors) 21a, 21b, 21c, etc. (collectively or generically referred to as processor(s) 21). In one or more embodiments, each processor 21 may include a reduced instruction set computer (RISC) microprocessor. Processors 21 are coupled to system memory 34 and various other components via a system bus 33. Read only memory (ROM) 22 is coupled to the system bus 33 and may include a basic input/output system (BIOS), which controls certain basic functions of system 300.

FIG. 3 further depicts an input/output (I/O) adapter 27 and a network adapter 26 coupled to the system bus 33. I/O adapter 27 may be a small computer system interface (SCSI) adapter that communicates with a hard disk 23 and/or tape storage drive 25 or any other similar component. I/O adapter 27, hard disk 23, and tape storage device 25 are collectively referred to herein as mass storage 24. Operating system 40 for execution on the processing system 300 may be stored in mass storage 24. A network adapter 26 interconnects bus 33 with an outside network 36 enabling data processing system 300 to communicate with other such systems. A screen (e.g., a display monitor) 35 is connected to system bus 33 by display adaptor 32, which may include a graphics adapter to improve the performance of graphics intensive applications and a video controller. In one embodiment, adapters 27, 26, and 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 all interconnected to bus 33 via user interface adapter 28, which may include, for example, a Super I/O chip integrating multiple device adapters into a single integrated circuit.

In exemplary embodiments, the processing system 300 includes a graphics processing unit 41. Graphics processing unit 41 is a specialized electronic circuit designed to manipulate and alter memory to accelerate the creation of images in a frame buffer intended for output to a display. In general, graphics processing unit 41 is very efficient at manipulating computer graphics and image processing and has a highly parallel structure that makes it more effective than general-purpose CPUs for algorithms where processing of large blocks of data is done in parallel.

Thus, as configured in FIG. 3, the system 300 includes processing capability in the form of processors 21, storage capability including system memory 34 and mass storage 24, input means such as keyboard 29 and mouse 30, and output capability including speaker 31 and display 35. In one embodiment, a portion of system memory 34 and mass storage 24 collectively store an operating system coordinate the functions of the various components shown in FIG. 3.

Turning now to an overview of technologies that are more specifically relevant to aspects of the invention, risk alert service providers typically can generate risk alerts across a large geographical area. The risk alerts range in severity level from minor to major events that can have minor to substantial business continuity and economic impact. Collectively, these services provide a broad range of data sources and real-time information feeds to identify, alert, and accelerate the mitigation of a risk event. However, some risk alert service providers have access to more relevant data and have access to better equipment for analyzing and identifying potential risk alerts and determining a more accurate impact for the potential risk alert. For example, news agencies that have local reporting resources close to an impactful risk event, such as a snowstorm, would have access to more accurate information regarding the severity of the snowstorm and the locations that are impacted by the snow storm. This is in contrast to more national news agencies that do not have local reporting resources close to the location of the potential impactful risk event which may rely on older data when generating a risk alert. Given the magnitude of potential economic damages and concerns for public safety from these risk event, a need exists to more accurately identify, alert, and mitigate risk events in real time prior to or immediately after an impact of the risk events.

Turning now to an overview of the aspects of the invention, one or more embodiments of the invention address the above-described shortcomings of the prior art by providing a system and method to identify and evaluate risk alerts across multiple risk alert data sources. Embodiments of the invention include a process for applying an ensemble analysis to identify and evaluate the most severe risk impacting events as reported across multiple risk alert service providers. Ensemble analysis methods utilize one or more machine learning algorithms to obtain better predictive performance than could be obtained from any of the constituent learning algorithms alone. A machine learning ensemble includes a concrete, finite set of alternative models, but typically allows for much more flexible structure to exist among those alternatives. Embodiments of the invention include a cluster resemblance algorithm to identify the trustworthiness of a risk alert service provider for certain risk events. As described herein, risk alerts can include any type of alert associated with a potential risk that can interrupt economic operations for a client such as, for example, extreme weather conditions, infrastructure damage (e.g., road closures, bridge closures), sociological or political unrest, and any other event that could impact the operations and economics for a client (e.g., company, group of companies, and other locations of interest such as: supply chain sites, supplier locations, data centers, hospitals, facilities, real estate, etc.). Embodiments of the invention obtain and/or receive risk alerts from providers that supply these risk alerts such as, for example, news or government sources. Certain characteristics of these providers are identified and analyzed such as, for example, a trustworthiness index, proximity to the risk event, and provider popularity index. Also, a cluster size (e.g., number of clusters of the risk event) is obtained and/or received to determine whether the risk event can be impactful on the operation and/or economics of a client. One other dimension is the specificity of the report/alert. For example, in the case of a hurricane event, reporting may include 500,000 without power and 17 casualties, and 30 inches of rain as of a certain date can be more helpful for risk assessment, than simply stating, for example, power outages, casualties, and flooding occurred.

Figure 4:
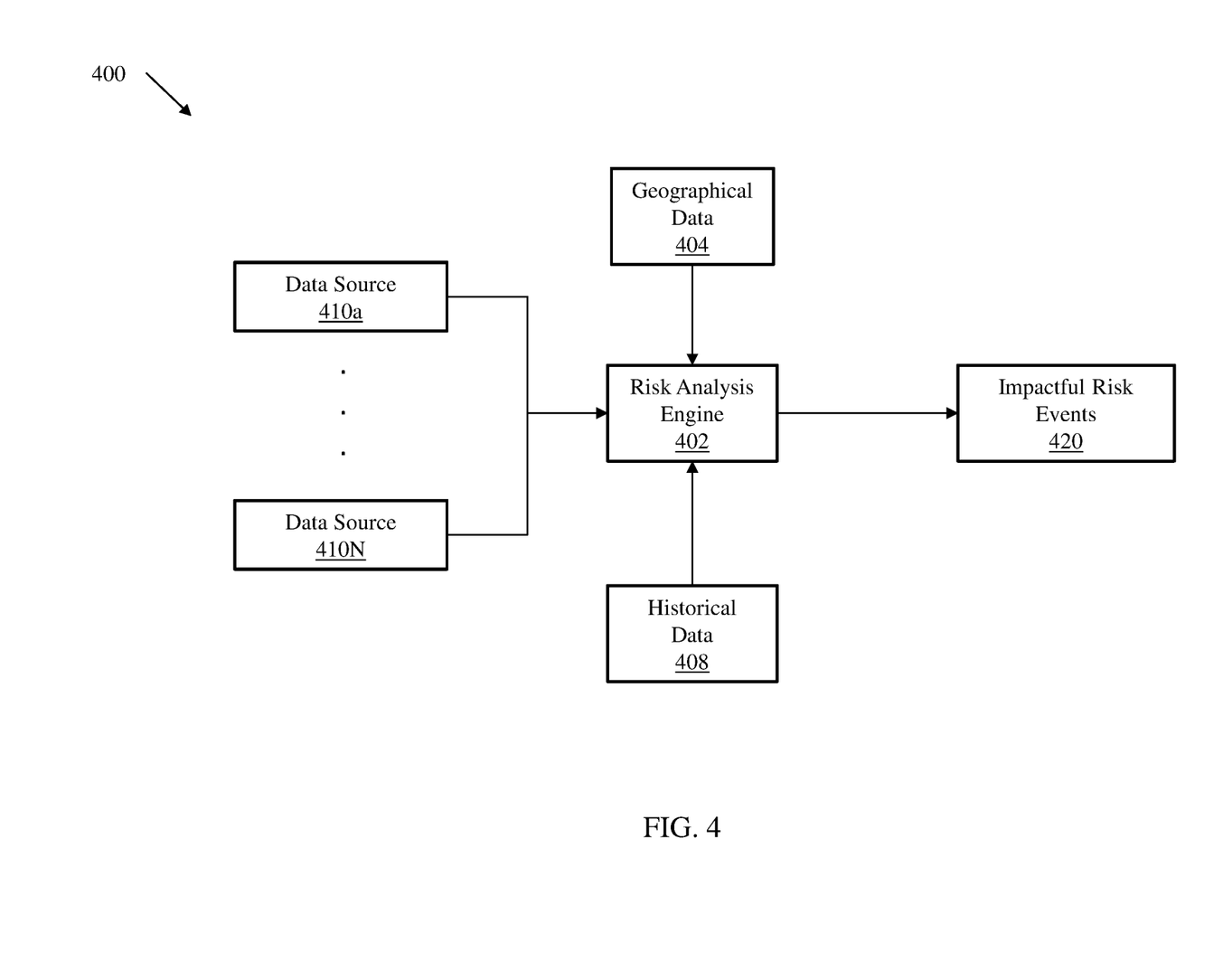
FIG. 4 depicts a system for identifying and evaluating risk according to embodiments of the invention.

Turning now to a more detailed description of aspects of the present invention, FIG. 4 depicts a system for identifying and evaluating risk according to embodiments of the invention. The system 400 includes a risk analysis engine 402 that is configured to obtain or receive risk alerts from a plurality of data sources 410a-410N, where N is an integer value greater than 2. The risk analysis engine 402 can receive geographical data 404 that includes locations of interest for a client that include one or more infrastructure resources for the client. Infrastructure resources can include, for example, office buildings, manufacturing locations, warehouse locations, supplier locations, vendor locations, or any type of facility that supports a locations of interest for a client. For example, a location of interest for a client can be an office building located in a city that may be affected by a potential risk event. The risk analysis engine 402 can also receive historical data 408 that includes historic impactful events as well as the economic and operational effect the risk events had on locations of interest for the client. The risk analysis engine 402 can analyze the risk alert data received from the data sources 410a-410N and compare the risk alert data with the geographical data 404 for the client to identify impactful risk events 420 that would affect one or more locations of interest for a client. These impactful risk events 420 can include severe weather, for example, that could cause operation interruption for the client or could affect a supplier in the client's operations.

In one or more embodiments of the invention, the risk analysis engine 402 can be implemented on the processing system 300 found in FIG. 3. Additionally, the cloud computing system 50 can be in wired or wireless electronic communication with one or all of the elements of the system 400. Cloud 50 can supplement, support or replace some or all of the functionality of the elements of the system 400. Additionally, some or all of the functionality of the elements of system 400 can be implemented as a node 10 (shown in FIGS. 1 and 2) of cloud 50. Cloud computing node 10 is only one example of a suitable cloud computing node and is not intended to suggest any limitation as to the scope of use or functionality of embodiments of the invention described herein.

In embodiments of the invention, the risk analysis engine 402 can also be implemented as so-called classifiers (described in more detail below). In one or more embodiments of the invention, the features of the various engines/classifiers 402 described herein can be implemented on the processing system 300 shown in FIG. 3 or can be implemented on a neural network (not shown). In embodiments of the invention, the features of the engines/classifiers 402 can be implemented by configuring and arranging the processing system 300 to execute machine learning (ML) algorithms. In general, ML algorithms, in effect, extract features from received data (e.g., inputs to the engines 402) in order to "classify" the received data. Examples of suitable classifiers include but are not limited to neural networks (described in greater detail below), support vector machines (SVMs), logistic regression, decision trees, hidden Markov Models (HMMs), etc. The end result of the classifier's operations, i.e., the "classification," is to predict a class for the data. The ML algorithms apply machine learning techniques to the received data in order to, over time, create/train/update a unique "model." The learning or training performed by the engines/classifiers 402 can be supervised, unsupervised or a hybrid that includes aspects of supervised and unsupervised learning. Supervised learning is when training data is already available and classified/labeled. Unsupervised learning is when training data is not classified/labeled so must be developed through iterations of the classifier. Unsupervised learning can utilize additional learning/training methods including, for example, clustering, anomaly detection, neural networks, deep learning, and the like.

In embodiments of the invention where the engines/classifiers 402 are implemented as neural networks, a resistive switching device (RSD) can be used as a connection (synapse) between a pre-neuron and a post-neuron, thus representing the connection weight in the form of device resistance. Neuromorphic systems are interconnected processor elements that act as simulated "neurons" and exchange "messages" between each other in the form of electronic signals. Similar to the so-called "plasticity" of synaptic neurotransmitter connections that carry messages between biological neurons, the connections in neuromorphic systems such as neural networks carry electronic messages between simulated neurons, which are provided with numeric weights that correspond to the strength or weakness of a given connection. The weights can be adjusted and tuned based on experience, making neuromorphic systems adaptive to inputs and capable of learning. For example, a neuromorphic/neural network for handwriting recognition is defined by a set of input neurons, which can be activated by the pixels of an input image. After being weighted and transformed by a function determined by the network's designer, the activations of these input neurons are then passed to other downstream neurons, which are often referred to as "hidden" neurons. This process is repeated until an output neuron is activated. Thus, the activated output neuron determines (or "learns") which character was read. Multiple pre-neurons and post-neurons can be connected through an array of RSD, which naturally expresses a fully-connected neural network. In the descriptions here, any functionality ascribed to the system 400 can be implemented using the processing system 300 applies.

The risk analysis engine 402 can perform natural language processing (NLP) analysis techniques on the content of the risk alerts obtained from the data sources 410a-410N to obtain keywords and other features from the risk alerts by parsing, syntactical analysis, morphological analysis, and other processes including statistical modeling and statistical analysis. The type of NLP analysis can vary by language and other considerations. The NLP analysis is utilized to generate a first set of NLP structures and/or features. These NLP structures include a translation and/or interpretation of the natural language input, including synonymous variants thereof. The risk analysis engine 402 can analyze the features to determine a context for the features for each risk event. NLP analysis can be utilized to extract attributes (features) from the natural language. These attributes include, but are not limited to, risk types, the severity of the potential risk, locations of the risk, affected areas within the locations, changes in travel corridors to and from the location and, in some embodiments, metadata associated with the risk alert, for example. The metadata can include information such as the location of the data source. In embodiments, data sources 410a-410N can include social media sources that include location data that can identify the location of the social media user in relation to the risk event.

Figure 5:
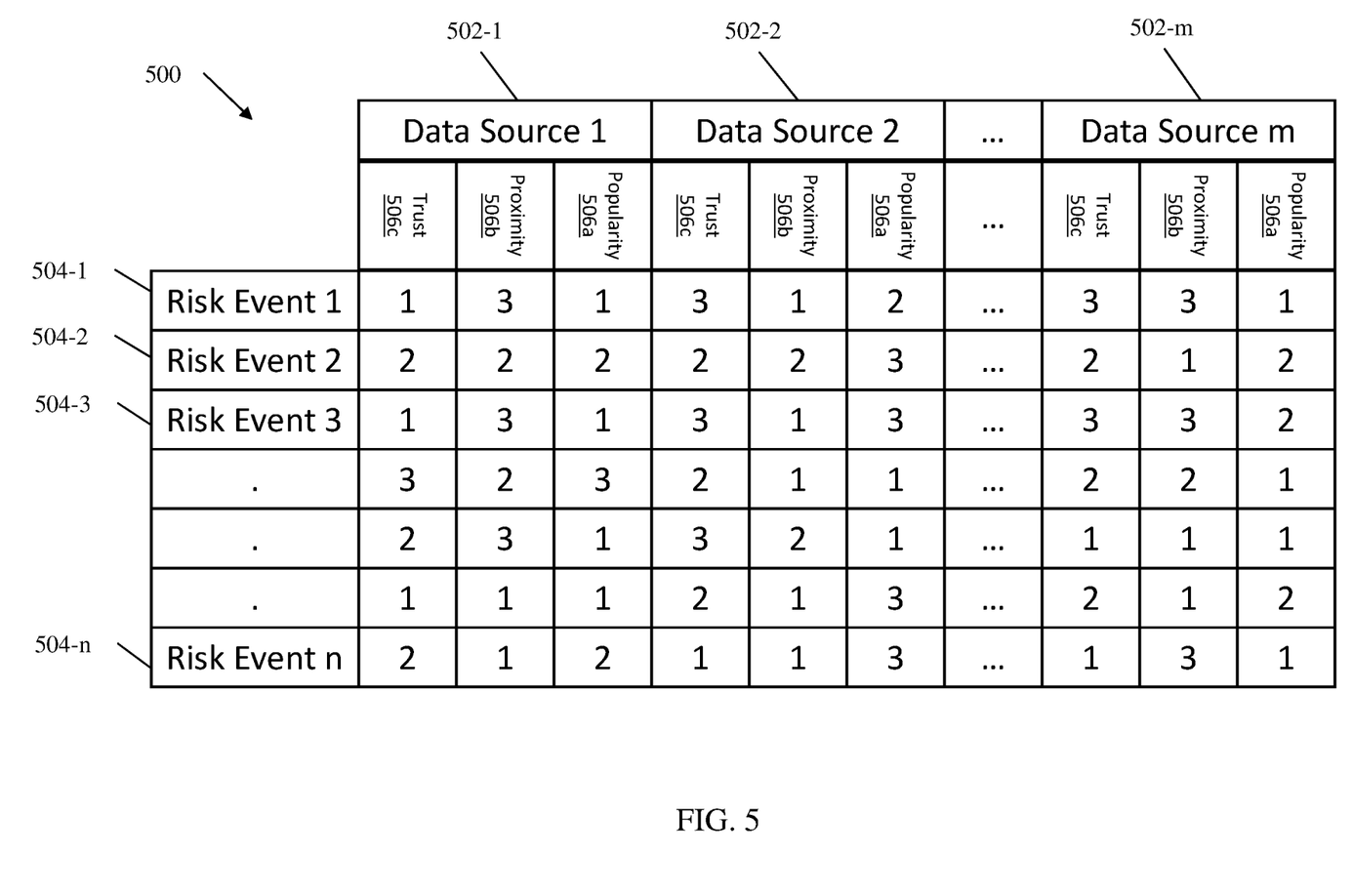
FIG. 5 depicts a diagram of a risk visualization scorecard according to one or more embodiments of the invention.

In one or more embodiments, the risk analysis engine 402 can generate a risk visualization scorecard that depicts any identified risk events, the characteristics of the data sources that range from the reliability of the data source, the proximity of the data source to the risk event location, and the popularity of the data source. FIG. 5 depicts a diagram of a risk visualization scorecard according to one or more embodiments of the invention. The scorecard 500 depicts data sources 502-1-502-m, where m is any integer value greater than 2. Each data source has a field for the data source characteristics that include popularity 506a, proximity 506b, and trust 506c. These three characteristics are for exemplary purposes and are not intended to limit the scope of data source characteristics that can be utilized herein. The scorecard 500 includes multiple risk events 504-1-504-n, where n is an integer value greater than 2. In the scorecard 500, for each risk event 504-1-504-n, the data source characteristics (506a-c) for each data source 502-1-502-m have associated values populated into the scorecard 500. In this example, the values are numerical, however, in other embodiments, the values can be colors, images, and the like to indicate the associated data source characteristic value. As used herein, the number 1 represents a low value for the characteristic, the number 2 represents a medium value for the characteristic, and the number 3 represents a high value for the characteristic. For example, for risk alert 1 (504-1), the characteristics for data source 2 (502-2) include a high trustworthiness value (e.g., 3), a low proximity value (e.g., 1), and a medium popularity value (e.g., 2). Trustworthiness can indicate an expertise in certain areas. For example, for flooding information, the national weather service would have a high trustworthiness based on the expertise associated with their coverage of weather-related events. However, a region news organization may have a lower trustworthiness on the weather because the regional news organization might not have access to quality information related to weather events, for example. The proximity of the data source to the location of the risk event can indicate a more knowledgeable description of the risk event and any local additional information that could be helpful for determining impact such as, for example, any transportation corridor closures like airports, bridges, and roads. And the popularity can indicate that based on a number of subscriptions or followers of the data source can show the data source is reliable in the reporting of risk events.

Figure 6:
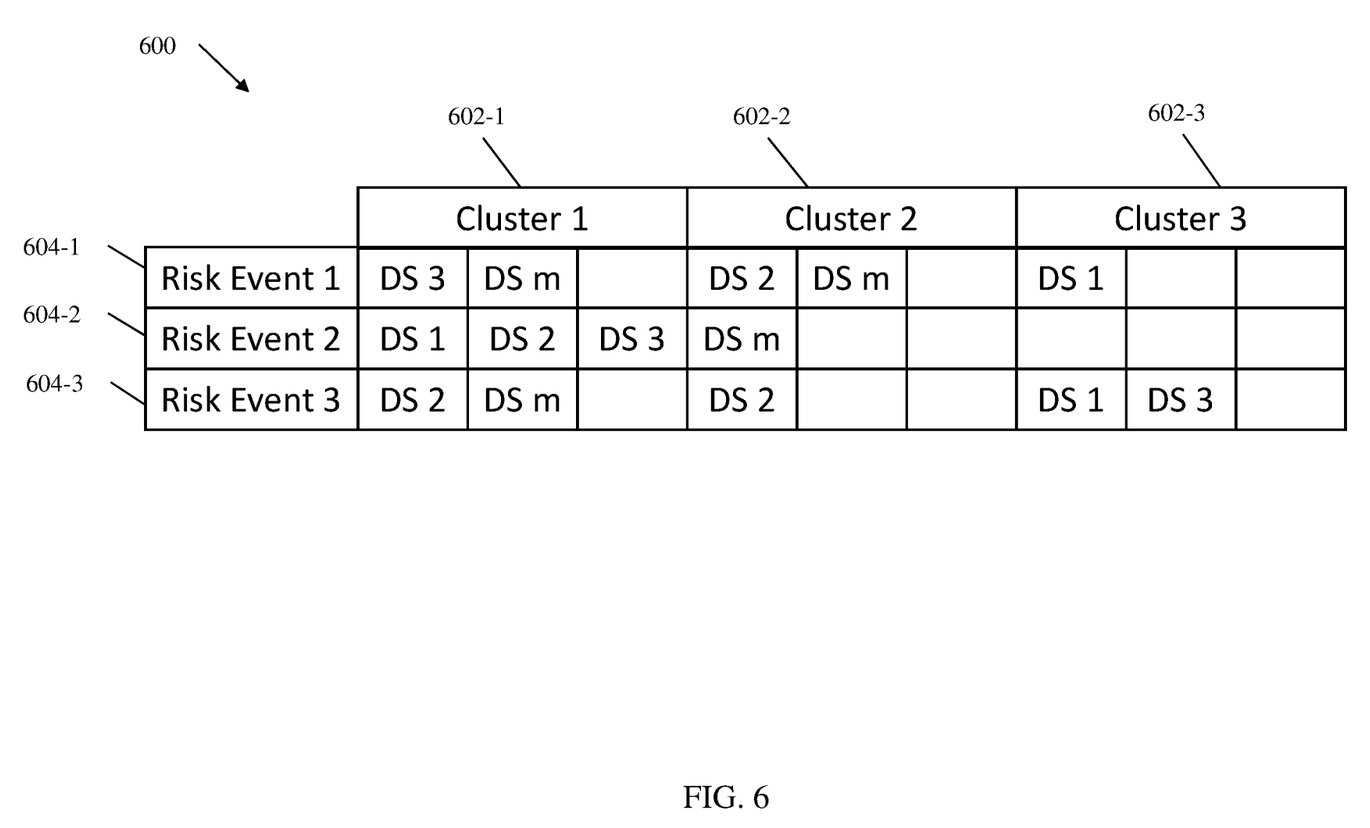
FIG. 6 depicts a diagram of a clustering analysis scorecard on trusted data sources according to one or more embodiments of the invention.

In one or more embodiments, the risk analysis engine 402 can cluster, using machine learning models, these data sources to show a relationship between the data sources and the risk events. FIG. 6 depicts a diagram of a clustering analysis scorecard on trusted data sources according to one or more embodiments of the invention. This scorecard 600 includes clusters 602-1-602-3 and risk events 604-1-604-3 and how the different data sources (DS-1-DS-m) are clustered based on their characteristics as related to the risk events. The cluster that has respondents with high values for all the attributes are the trusted data sources for that respective risk event.

Figure 7:
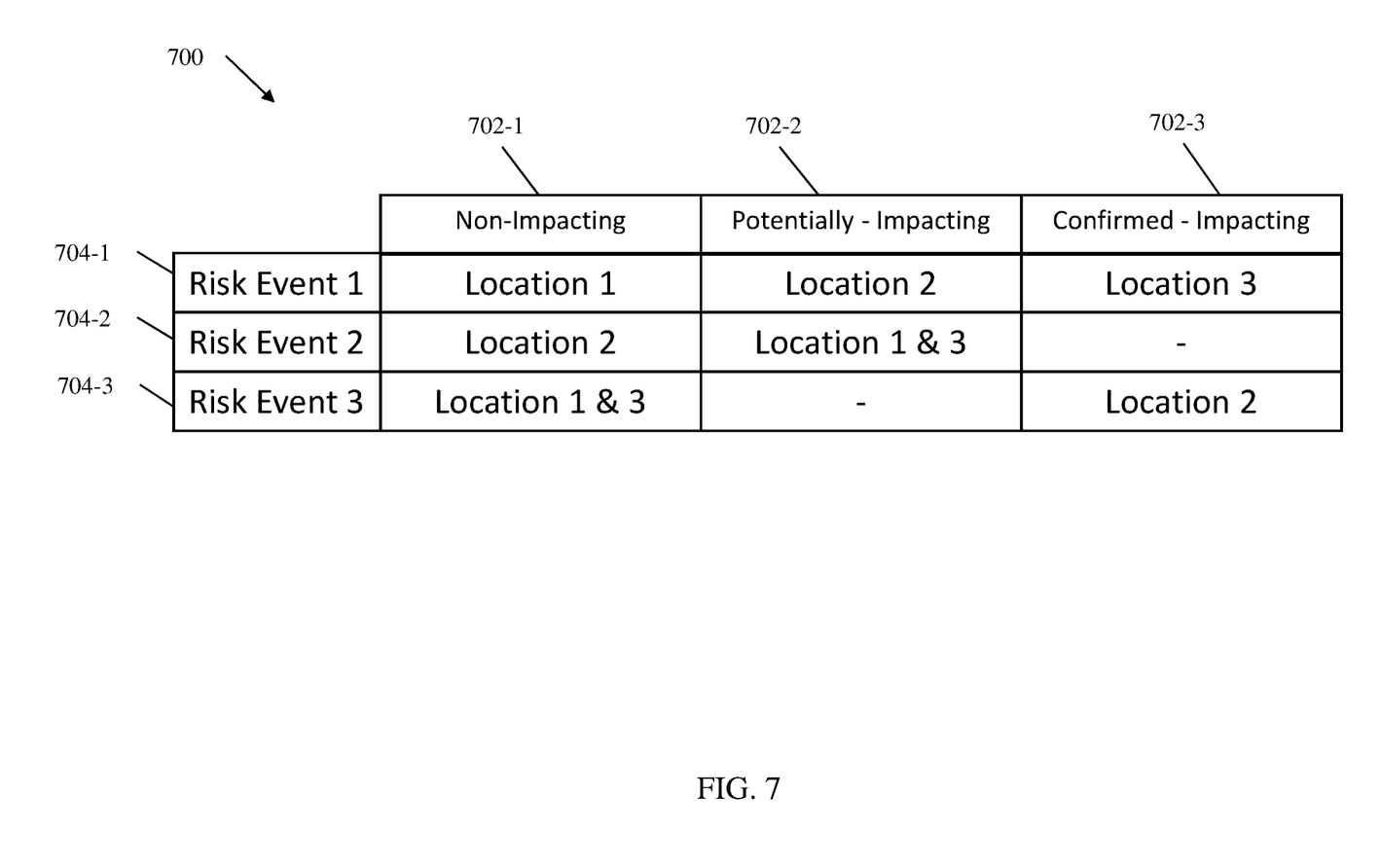
FIG. 7 depicts a diagram of an output of the categorization of risk events in to a non-impacting, potentially impacting, and confirmed impacting according to one or more embodiments of the invention.

In embodiments of the invention, once the trusted data sources are identified for the risk events, each risk event is evaluated as impacting a location of interest for a client. These locations of interest can be identified as impacted locations of interested by analyzing non-stationary environment characteristics (e.g., geospatial, temporal, and social media) of the risk event. For each pair of risk event and location of interest, trusted data is collected for the severity of the risk event, the proximity of the location of interest, the resilience from a risk event type for the resource at the location of interest, the infrastructure of the location of interest, and recovery of capability of location of interest attributes. This data gathering takes a bottom-up approach where information is first gathered from the lowest trusted data source up to the highest trusted data source. Once the data is gathered, an ensemble machine learning model can be applied to categorize the locations of interest into non-impacting, potentially impacting, and confirmed impacting for locations of interest for each of the risk events. FIG. 7 depicts a diagram 700 of an output of the categorization of risk events into a non-impacting, potentially impacting, and confirmed impacting according to one or more embodiments of the invention. The three categories (e.g., 702-1-702-3) have corresponding risk events (704-1-704-3) with locations of interest for a client. In this example, there are three locations of interest (Location 1, Location 2, and Location 3). In the illustrated example, Location 3 is a confirmed impacted location of interest for risk event 1 (704-1). Location 2 is potentially impacted by risk event 1 and Location 1 is non-impacting for risk event 1. In embodiments of the invention, a non-impacting risk event includes general alerts with a geospatial location outside locations of interest for a client (company). A potentially impacting risk event includes risk alerts that occur with a geospatial location that intersects with locations of interest for the client (company). And a confirmed impacting risk event includes a potentially impacting risk event that is confirmed to impact the operations of one or more locations of interest for the client.

Figure 8:
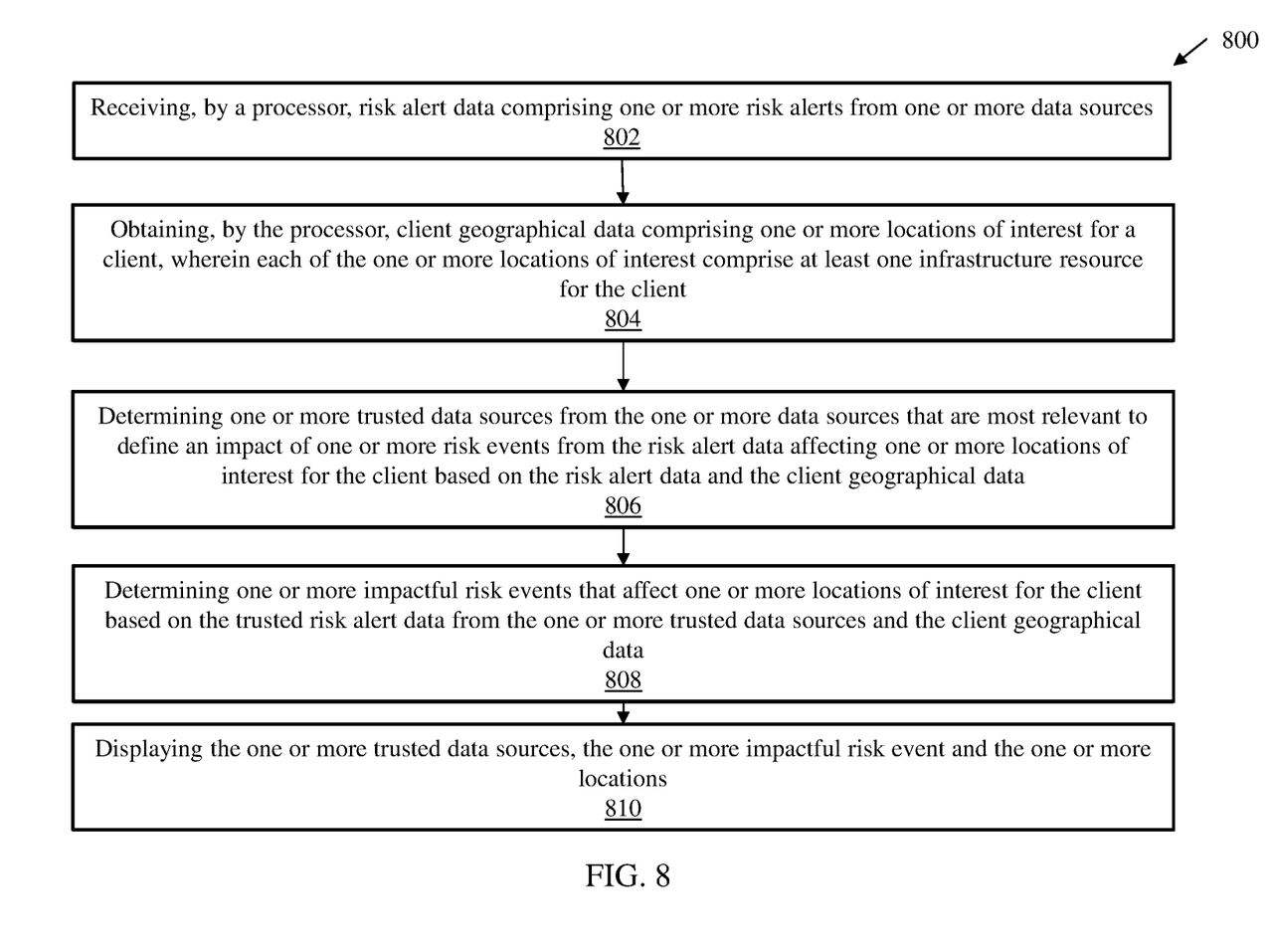
FIG. 8 depicts a flow diagram of a method for identifying and evaluating risks according to one or more embodiments of the invention.

FIG. 8 depicts a flow diagram of a method for identifying and evaluating risks according to one or more embodiments of the invention. The method 800 includes receiving, by a processor, risk alert data comprising one or more risk alerts from one or more data sources, as shown in block 802. At block 804, the method 800 includes obtaining, by the processor, client geographical data comprising one or more locations of interest for a client, wherein each of the one or more locations of interest comprise at least one infrastructure resource for the client. The method 800, at block 806, includes determining one or more trusted data sources from the one or more data sources that are most relevant to define an impact of one or more risk events from the risk alert data affecting one or more locations of interest for the client based on the risk alert data and the client geographical data. The method 800, at block 808, includes determining one or more impactful risk events that affect one or more locations of interest for the client based on trusted risk alert data from the one or more trusted data sources, and the client geographical data. And at block 810, the method 800 includes displaying the one or more trusted data sources, the one or more impactful risk events, and the one or more locations.

Additional processes may also be included. It should be understood that the processes depicted in FIG. 8 represent illustrations and that other processes may be added or existing processes may be removed, modified, or rearranged without departing from the scope and spirit of the present invention.

In one or more embodiments of the invention, identifying which data source is most effective at identifying an impacting event for each risk type. For example, the United States Geological Services (USGS) is widely accepted as the best real time source for Earthquake data and details globally. Whereas some risk alert data sources are better for hurricanes (like NOAA), others are better for Distribution issues (DHL Resilence360) and others for Social Unrest reporting (CNN or BBC). Through the analysis of historical records, our invention makes this assessment of severity, across many risk alert sources.

Figure 9:
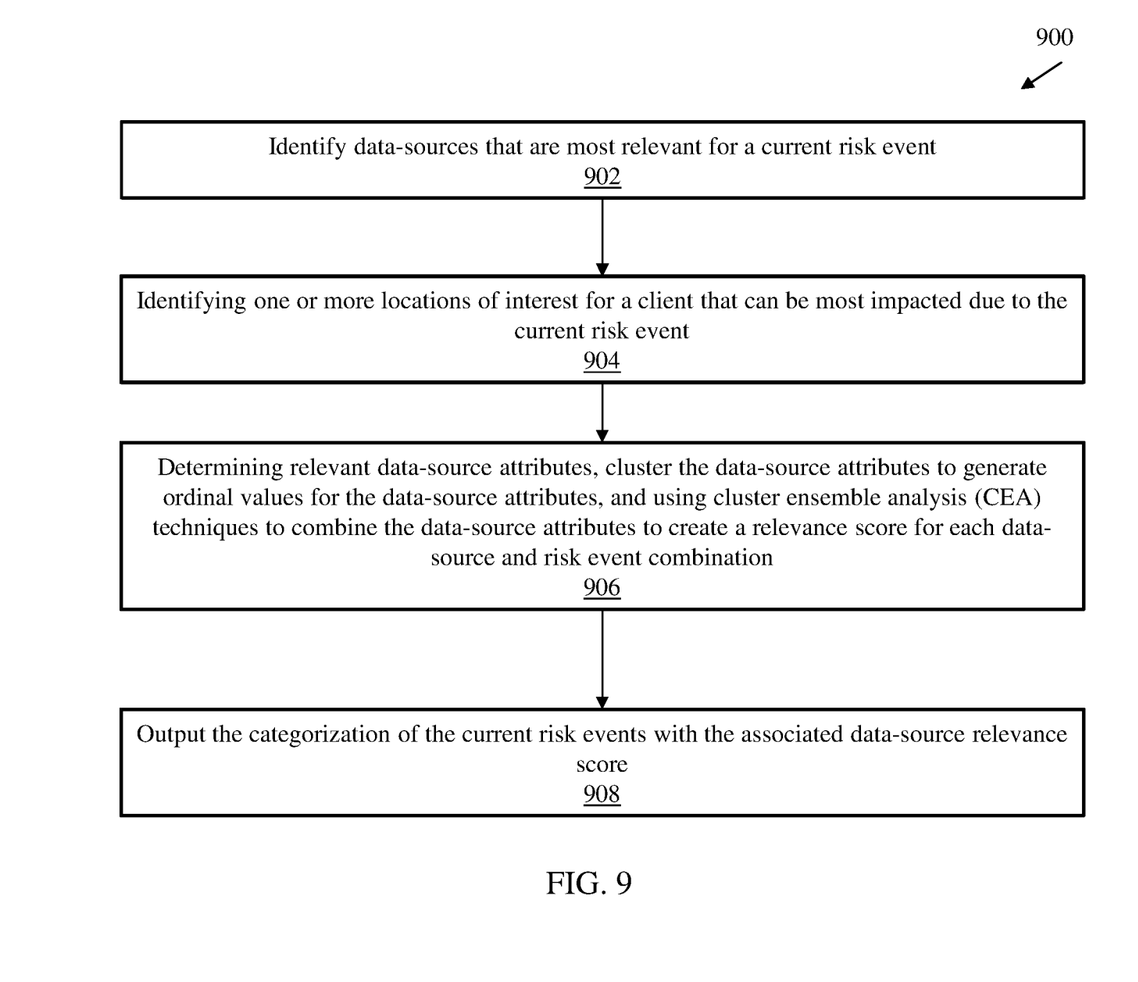
FIG. 9 depicts of a flow diagram of a method for identifying critical risk events from noise according to one or more embodiments of the invention.

FIG. 9 depicts of a flow diagram of a method for identifying critical risk events from noise according to one or more embodiments of the invention. The method 900 includes identifying data-sources that are most relevant for a current risk event, as shown in block 902. The relevant data sources can be identified based on factors described herein including, for example, proximity to the risk event, reliability ratings of the data source, and expertise of the data source (e.g., NOAA for hurricane events). The method 900 then includes identifying one or more locations of interest for a client that can be most impacted due to the current risk event, as shown in block 904. The one or more locations of interest include operational locations for a client. The impact can be determined based on geo-location data of the locations of interest compared to the data-sources reporting of the risk event. The method 900, at block 906, includes determining relevant data-source attributes, cluster the data-source attributes to generate ordinal values for the data-source attributes, and using cluster ensemble analysis (CEA) techniques to combine the data-source attributes to create a relevance score for each data-source and risk event combination. And at block 908, the method 900 includes outputting the categorization of the current risk events with the associated data-source relevance scoring. The output can include any combination of risk events ratings, data source ratings, and locations of interest as illustrated in FIGS. 5-7.

Additional processes may also be included. It should be understood that the processes depicted in FIG. 9 represent illustrations and that other processes may be added or existing processes may be removed, modified, or rearranged without departing from the scope and spirit of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for identifying and evaluating trusted data sources for impacting risks, the method comprising:
   receiving, by a processor, risk alert data comprising one or more risk alerts from one or more data sources, wherein the risk alert data comprises a real-time information feed received over a network connection;
   obtaining, by the processor, client geographical data comprising one or more locations of interest for a client, wherein each of the one or more locations of interest comprise at least one infrastructure resource for the client;

iteratively training, using a machine learning model, a classifier implementing machine learning techniques comprising one or more of: neural networks, support vector machines (SVM), deep learning, unsupervised learning, or a hybrid of unsupervised learning and supervised learning;

determining one or more trusted data sources from the one or more data sources that are most relevant to define an impact of one or more risk events from the risk alert data affecting one or more locations of interest for the client based on the risk alert data and the client geographical data, wherein determining the one or more trusted data sources comprises parsing the real-time information feed It should be extract, using the trained classifier and applying natural language processing (NLP), features comprising a plurality of features extracted from the real-time information feed during parsing;

determining one or more impactful risk events that affect one or more locations of interest for the client based on trusted risk alert data from the one or more trusted data sources and the client geographical data;

displaying the one or more trusted data sources, the one or more impactful risk events, and the one or more locations, wherein displaying the impactful risk event comprises:

generating a scorecard comprising a visual representation of the one or more impactful risk event and one or more characteristics of the one or more data sources, wherein the one or more characteristics of the one or more data sources comprises a popularity rating of each of the one or more data sources, wherein the popularity rating is based on a number of social media followers of a data source; and displaying the scorecard to a user;

receiving a threshold risk threshold;

generating a risk score for at least one of the one or more impactful risk events; and responsive to the risk score for the at least one of the one or more impactful risk events being above the threshold, initiating a work event, wherein the work event comprises a shutting down of work activities at an infrastructure location for the client associated with the at least one impactful risk event.

2. The computer-implemented method of claim 1, wherein the one or more characteristics of the one or more data sources further comprises a reliability rating of each of the one or more data sources and a proximity of each of the one or more data sources to the impactful risk event.

3. The computer-implemented method of claim 1, wherein determining one or more trusted data sources and determining the one or more impactful risk events further comprises generating, by a machine learning model, a feature vector comprising a plurality of features extracted from the risk alert data and client geographical data.

4. The computer-implemented method of claim 3, wherein the machine learning model comprises a clustering ensemble algorithm.

5. The computer-implemented method of claim 1 further comprising:

filtering the risk alert data by comparing a location of each of the one or more risk alerts to the client geographical data to determine non-impacting risk alerts; and removing non-impacting risk alerts from the risk alert data, wherein non-impacting risk alerts comprise risk alerts outside a geographical area of the client.

6. The computer-implemented method of claim 1, wherein the at least one of the one or more locations of interest for the client comprises a operational resource for the client; and further comprising initiating a change order from a different operational resource not affected by the one or more impactful risk events.

7. A system for identifying and evaluating risks, the system comprising a processor communicative coupled to a memory, the processor configured to:

receive risk alert data comprising one or more risk alerts from one or more data sources, wherein the risk alert data comprises a real-time information feed received over a network connection;

obtain client geographical data comprising one or more locations of interest for a client, wherein each of the one or more locations of interest comprise at least one infrastructure resource for the client;

iteratively train, using a machine learning model, a classifier implementing machine learning techniques comprising one or more of: neural networks, support vector machines (SVM), deep learning, unsupervised learning, or a hybrid of unsupervised learning and supervised learning;

determine one or more impactful risk events that affect one or more locations of interest for the client based on the risk alert data and the client geographical data, wherein determining the one or more trusted data sources comprises parsing the real-time information feed to extract, using the trained classifier and applying natural language processing (NLP), features comprising a plurality of features extracted from the real-time information feed during parsing; and display the impactful risk event and the one or more locations, wherein displaying the impactful risk event comprises:

generating a scorecard comprising a visual representation of the one or more impactful risk event and one or more characteristics of the one or more data sources, wherein the one or more characteristics of the one or more data sources comprises a popularity rating of each of the one or more data sources, wherein the popularity rating is based on a number of social media followers of a data source; and displaying the scorecard to a user;

receiving a threshold risk threshold;

generating a risk score for at least one of the one or more impactful risk events; and responsive to the risk score for the at least one of the one or more impactful risk events being above the threshold, initiating a work event, wherein the work event comprises a shutting down of work activities at an infrastructure location for the client associated with the at least one impactful risk event.

8. The system of claim 7, wherein the one or more characteristics of the one or more data sources further comprises a reliability rating of each of the one or more data sources and a proximity of each of the one or more data sources to the impactful risk event.

9. The system of claim 7, wherein determining the one or more impactful risk events further comprises generating, by a machine learning model, a feature vector comprising a plurality of features extracted from the risk alert data and client geographical data.

10. The system of claim 9, wherein the machine learning model comprises a clustering ensemble algorithm.

11. A computer program product for identifying and evaluating risks, the computer program product comprising a computer readable storage medium having program instructions embodied therewith, wherein the computer readable storage medium is not a transitory signal per se, the program instructions executable by a processor to cause the processor to perform a method comprising:

receiving, by a processor, risk alert data comprising one or more risk alerts from one or more data sources, wherein the risk alert data comprises a real-time information feed received over a network connection;

obtaining, by the processor, client geographical data comprising one or more locations of interest for a client, wherein each of the one or more locations of interest comprise at least one infrastructure resource for the client;

iteratively training, using a machine learning model, a classifier implementing machine learning techniques comprising one or more of: neural networks, support vector machines (SVM), deep learning, unsupervised learning, or a hybrid of unsupervised learning and supervised learning;

determining one or more impactful risk events that affect one or more locations of interest for the client based on the risk alert data and the client geographical data, wherein determining the one or more trusted data sources comprises parsing the real-time information feed to extract, using the trained classifier and applying natural language processing (NLP), features comprising a plurality of features extracted from the real-time information feed during parsing"; and     displaying the impactful risk event and the one or more locations, wherein displaying the impactful risk event comprises:

generating a scorecard comprising a visual representation of the one or more impactful risk event and one or more characteristics of the one or more data sources, wherein the one or more characteristics of the one or more data sources comprises a popularity rating of each of the one or more data sources, wherein the popularity rating is based on a number of social media followers of a data source; and     displaying the scorecard to a user;

receiving a threshold risk threshold;

generating a risk score for at least one of the one or more impactful risk events; and     responsive to the risk score for the at least one of the one or more impactful risk events being above the threshold, initiating a work event, wherein the work event comprises a shutting down of work activities at an infrastructure location for the client associated with the at least one impactful risk event.

12. The computer program product of claim 11, wherein the one or more characteristics of the one or more data sources further comprises a reliability rating of each of the one or more data sources and a proximity of each of the one or more data sources to the impactful risk event.

13. The computer program product of claim 11, wherein determining the one or more impactful risk events further comprises generating, by a machine learning model, a feature vector comprising a plurality of features extracted from the risk alert data and client geographical data.

14. The computer program product of claim 13, wherein the machine learning model comprises a clustering ensemble algorithm.

15. The computer program product of claim 11 further comprising:

filtering the risk alert data by comparing a location of each of the one or more risk alerts to the client geographical data to determine non-impacting risk alerts; and     removing non-impacting risk alerts from the risk alert data, wherein non-impacting risk alerts comprise risk alerts outside a geographical area of the client.

\* \* \* \* \*